US009002751B2

(12) United States Patent
Moon et al.

(10) Patent No.: US 9,002,751 B2
(45) Date of Patent: Apr. 7, 2015

(54) APPARATUS AND METHOD FOR AUTHORIZATION OF ONLINE FINANCIAL TRANSACTION

(75) Inventors: Jung-Hwan Moon, Seoul (KR);
Byung-Joon Kim, Yongin-si (KR);
Hyoung-Chun Kim, Seoul (KR);
Sang-Woo Park, Daejeon (KR);
E-Joong Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 410 days.

(21) Appl. No.: 13/481,252

(22) Filed: May 25, 2012

(65) Prior Publication Data

US 2013/0166449 A1 Jun. 27, 2013

(30) Foreign Application Priority Data

Dec. 26, 2011 (KR) .......................... 10-2011-0142652

(51) Int. Cl.
*G06Q 20/00* (2012.01)
*G06Q 20/40* (2012.01)
(52) U.S. Cl.
CPC .................................. *G06Q 20/405* (2013.01)
(58) Field of Classification Search
CPC .................................................... G06Q 20/405
USPC ........................................................... 705/75
See application file for complete search history.

(56) References Cited

U.S. PATENT DOCUMENTS

| 8,151,345 | B1* | 4/2012 | Yeager ........................... 726/20 |
| 2003/0177353 | A1* | 9/2003 | Hiltgen ......................... 713/161 |
| 2008/0128513 | A1* | 6/2008 | Hammad et al. .............. 235/492 |

FOREIGN PATENT DOCUMENTS

| KR | 10-2001-0111919 A | 12/2001 |
| KR | 10-2007-0010356 A | 1/2007 |
| KR | 10-1025807 B1 | 4/2011 |
| KR | 10-2011-0062931 A | 6/2011 |
| WO | 2012/043963 A1 | 4/2012 |

OTHER PUBLICATIONS

Thomas Weigold et al., "Secure Confirmation of Sensitive Transaction Data in Modern Internet Banking Services," WorldCIS 2011 Conference, 2011.

* cited by examiner

*Primary Examiner* — Charles C Agwumezie
(74) *Attorney, Agent, or Firm* — LRK Patent Law Firm (57) ABSTRACT

A method and an apparatus for authorizing online financial transactions are provided. The apparatus for authorizing online financial transactions includes: randomly selecting, using an apparatus for authorizing online financial transactions, a portion of main transaction information corresponding to a user and combining the selected information to create authorization information; converting the authorization information into a form displayed to the user through a specific process; providing the main transaction information and the converted authorization information to the user; receiving user select information, which is recognized by the user and is part of the main transaction information, and the converted authorization information provided to the user; and comparing the user select information with the authorization information and determining whether the user recognizes the authorization information based on the comparison results.

6 Claims, 9 Drawing Sheets

RED 123-456789-01-234

▨GREEN ▧YELLOW ▨RED ▧BLACK

▨GREEN ▧YELLOW ▨RED ▧BLACK

RED

PLEASE INPUT AUTHORIZATION INFORMATION VALUE
AND OPT [ ************ ]

FIG.11

RED  GREEN

PLEASE INPUT AUTHORIZATION INFORMATION VALUE
AND OPT [ ************ ]

APPARATUS AND METHOD FOR AUTHORIZATION OF ONLINE FINANCIAL TRANSACTION

CROSS-REFERENCE TO RELATED APPLICATION

This application claims priority to Korean Patent Application No. 10-2011-0142652 filed on Dec. 26, 2011, which is incorporated herein by reference in its entirety.

BACKGROUND OF THE INVENTION

1. Field of the Invention

Exemplary embodiments of the present invention relate to a method and an apparatus for authorizing online financial transactions, and more particularly, to a method and an apparatus for authorizing online financial transactions using a technology for creating financial transaction information and a one-time password so as to protect a user from a man-in-the-middle attack using web injection,'a memory hacking attack, a remote control attack, or the like, at the time of an online financial transaction.

2. Description of Related Art

Recently, in online financial transactions, the integrity of transaction information is secured by user authorization using a certificate, a one-time password (hereinafter, referred to as "OTP"), and a security card and an electronic signature using a certificate.

However, when malignant code for intercepting a value input using a keyboard is installed, hackers can acquire a password of a user certificate, an OTP value, and a security card value. In addition, hackers may modulate online financial transactions into a desired form using a man-in-the-middle attack (hereinafter, referred to as an "MITM attack") method.

In order to prevent important user information from being exposed, a keyboard security program has been used. The keyboard security program may prevent user input from being leaked to the outside during the transmission of the user input to a server using an end to end (E2E) encryption technology at the time of the online financial transaction. However, the keyboard security program has a weak point, which may lead to an MITM attack by hackers when a user inputs information using an image keyboard rather than using a keyboard.

The conventional representative measure for the MITM attack in the online financial transaction uses an OTP linked with a transaction.

The OTP linked with the transaction uses a separate hardware device, which is provided separately from a user computer (PC). This hardware apparatus includes a separate input device through which a user may include financial transaction content. For the online financial transaction, the user accesses the corresponding web sites to log in and input a desired type of transaction information. Further, the user inputs the transaction information to a hardware device based on the OTP linked with the transaction. The OTP linked with the transaction creates a cipher text, which is valid only for the corresponding transaction, and provides the created cipher text to a user, and the user uses the corresponding cipher text to access the web sites through a user computer. In this case, even though the values are exposed to hackers, the hackers do not decrypt the cipher text and thus, may not modulate the values into a desired form.

The method for using the OTP linked with the transaction may cause inconvenience to the user in that users needs to carry the OTP apparatus at all times (the OTP apparatus is larger than that of an OTP apparatus at the current time) and in that it is difficult to distribute the OTP linked with the transaction to existing users.

SUMMARY OF THE INVENTION

An embodiment of the present invention is directed to a method and an apparatus for authorizing online financial transactions using financial transaction information of a user and a technology for creating a one-time password so as to protect a user from an MITM attack using web injection, a memory hacking attack, a remote control attack, and the like, at the time of the online financial transaction.

In accordance with an embodiment of the present invention, an apparatus for authorizing online financial transactions includes: an authorization information creation unit, which is configured to randomly select a portion of main transaction information corresponding to a user and combine the selected information to create authorization information; a conversion unit, which is configured to convert the authorization information into a form displayed to the user through a specific process; a display unit, which is configured to provide the main transaction information and the converted authorization information to the user; an input unit, which is configured to receive user select information recognized by the user among the main transaction information and the converted authorization information provided from the display unit; and a user recognition determination unit, which is configured to compare the user select information with the authorization information and determine whether the user recognizes the authorization information based on the comparison results.

The authorization information may be information that is required in order to confirm whether the user recognizes transaction contents.

The conversion unit may convert the authorization information into a text form recognizable by the user so as to be converted into the main transaction information, including the authorization information, and convert the main transaction information into an image.

The image may correspond to a CAPTCHA image.

The user recognition determination unit may determine that the user accurately recognizes the authorization information when the user select information coincides with the authorization information, and accept the corresponding online financial transaction of the user.

In accordance with another embodiment of the present invention, an apparatus for authorizing online financial transaction includes: a secret storage unit, which is configured to include previously set secret information between a user and a server; an authorization information creation unit, which is configured to randomly select a portion of main transaction information corresponding to a user and combine the selected information to create authorization information; a conversion unit, which is configured to convert the authorization information into a form that is displayed to the user by using the secret information; a display unit, which is configured to provide the main transaction information and the converted authorization information to the user; an input unit, which is configured to receive user select information, recognized by the user among the main transaction information, and the converted authorization information provided from the display unit; and a user recognition determination unit, which is configured to compare the user select information with the authorization information and determine whether the user recognizes the authorization information based on the comparison results.

The authorization information may be information that is required in order to confirm whether the user recognizes transaction contents.

The conversion unit may convert text corresponding to the authorization information into secret color text by using secret colors among the secret information and convert text corresponding to a portion other than the authorization information among the main transaction information into text of some other color.

The secret color text may be converted into an image form, like a CAPTCHA image.

The user recognition determination unit may determine that the user has accurately recognized the authorization information when the user select information coincides with the authorization information, and accept the corresponding online financial transaction of the user.

In accordance with another embodiment of the present invention, an apparatus for authorizing online financial transactions includes: an authorization information creation unit, which is configured to randomly select a portion of main transaction information corresponding to a user and combine the selected information to create authorization information; an authorization number creation unit, which is configured to create an authorization number recognized by a user based on an OTP by using the authorization number; a conversion unit, which is configured to convert the authorization information into a form displayed to the user through a specific process; a display unit, which is configured to provide the main transaction information and the converted authorization information to the user; an input unit, which is configured to receive user select information recognized by the user among the main transaction information and the converted authorization information provided from the display unit based on the OTP corresponding to the user; an input unit, which is configured to receive user select information recognized by the user among the main transaction information and the converted authorization information provided from the display unit; and a user recognition determination unit, which is configured to compare the user select information with the authorization information and determine whether the user has recognized the authorization information based on the comparison results.

The authorization number creation unit may link information randomly selecting a portion of the main transaction information with the OTP in the authorization information creation unit to create the authorization number.

The authorization number creation unit may designate one number of the OTP as a secret color, and use the one number designated as the secret color as the authorization number.

The authorization number creation unit may use the main transaction information of digits corresponding to the OTP as the authorization number.

The conversion unit may convert the text corresponding to the authorization information into secret color text by using the secret colors, which are part of the secret information, and convert may text corresponding to a portion other than the authorization information into text of another color.

The conversion unit may include a random color table, including numbers from 0 to 9, and colors corresponding to each number, designate secret colors using the random color table and the OTP, convert the text corresponding to the authorization information into the secret color text in the main transaction information, and convert the text that does not correspond to the authorization information into text of another color in the main transaction information.

The secret color text and text of another color may be converted into an image form, like a CAPTCHA image.

In accordance with another embodiment of the present invention, a method for authorizing online financial transactions includes: randomly selecting a portion of main transaction information corresponding to a user and combining the selected information to create authorization information; converting the authorization information into a form displayed to the user through a specific process; providing the main transaction information and the converted authorization information to the user; receiving user select information, which is recognized by the user and is part of the main transaction information, and the converted authorization information provided to the user; and comparing the user select information with the authorization information and determining whether the user recognizes the authorization information based on the comparison results.

The determination may determine that the user accurately recognizes the authorization information and accept the corresponding online financial transaction of the user, when the user select information coincides with the authorization information.

The authorization information may be information required to confirm that the user recognizes the transaction contents.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, a method and an apparatus for authorizing online financial transactions in accordance with exemplary embodiments of the present invention will be described in detail with reference to the accompanying drawings.

Figure 1:
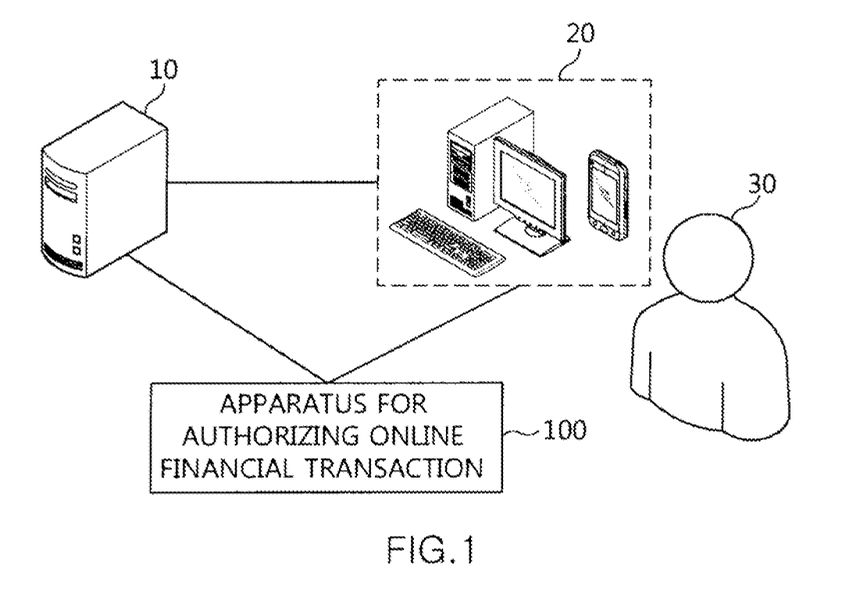
FIG. 1 is a diagram illustrating an environment in which a service for authorizing online financial transactions is provided in accordance with an exemplary embodiment of the present invention.

FIG. 1 is a diagram illustrating an environment for providing service for authorizing online financial transactions in accordance with an exemplary embodiment of the present invention.

Referring to FIG. 1, an environment in which service for authorizing online financial transactions is provided includes a server 10 performing online financial transactions, a user 20 intending to perform an online financial transaction, and a user terminal 20 carried by the user 20. In this configuration, the user terminal 30 may be a PC, a cellular phone, or the like, belonging to the user, but is not limited thereto.

An apparatus 100 for authorizing online financial transactions provides the service for authorizing the online financial transaction of the user 20 between the server 10 and the user terminal 30. In this case, the apparatus 100 for authorizing online financial transactions is illustrated as being disposed between the server 10 and the user terminal 30, but may be disposed within the server 10.

The method and apparatus for authorizing online financial transactions used in the environment in which the service of authorizing online financial transactions is provided includes a first exemplary embodiment, in which the online financial transaction is authorized based on a random display, and a third exemplary embodiment in which the online financial transaction is authorized based on an OTP.

Figure 2:
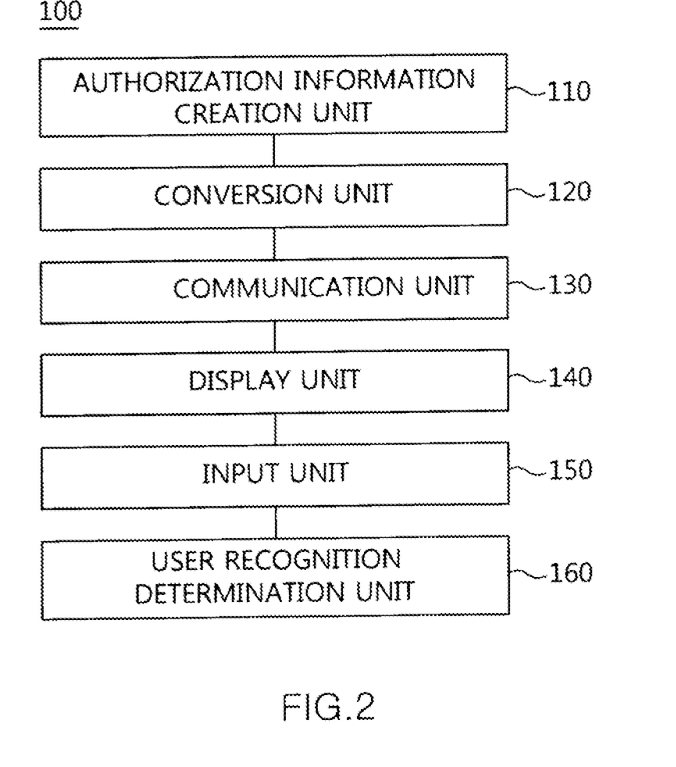
FIG. 2 is a configuration diagram schematically illustrating an apparatus for authorizing online financial transactions in accordance with a first exemplary embodiment of the present invention.

FIG. 2 is a configuration diagram schematically illustrating an apparatus for authorizing online financial transactions in accordance with a first exemplary embodiment of the present invention.

Referring to FIG. 2, the apparatus 100 for authorizing online financial transactions includes an authorization information creation unit 110, a conversion unit 120, a communication unit 130, a display unit 140, an input unit 150, and a user recognition determination unit 160.

The authorization information creation unit 110 randomly selects a portion of main transaction information corresponding to a user and combines the selected information to create the authorization information. This authorization information is information that is required in order to confirm whether the user recognizes transaction contents.

The conversion unit 120 converts the created authorization information into a form that is displayed to the user 20 through a specific process.

In detail, the conversion unit 120 converts the created authorization information into a user-recognizable text form, which is in turn converted into main transaction information including the authorization information. In addition, the conversion unit 120 converts the transaction information including the authorization information into an image form. Here, the image form may be a form such as a CAPTCHA image.

The communication unit 130, which serves to transmit and receive data between the server 10 and the user terminal 30, provides the converted authorization information and the main transaction information to the user 20 through the user terminal 30, and transmits the request of the user, for example, information input by the user, to the server 10.

The display unit 140 provides the main transaction information and the authorization information, converted in the conversion unit 120, to the user. As described above, the display unit 140 provides both the main transaction information and the converted authorization information to the user, such that the user 30 may recognize that the authorization information is selected as a portion of the main transaction information.

Figure 3:
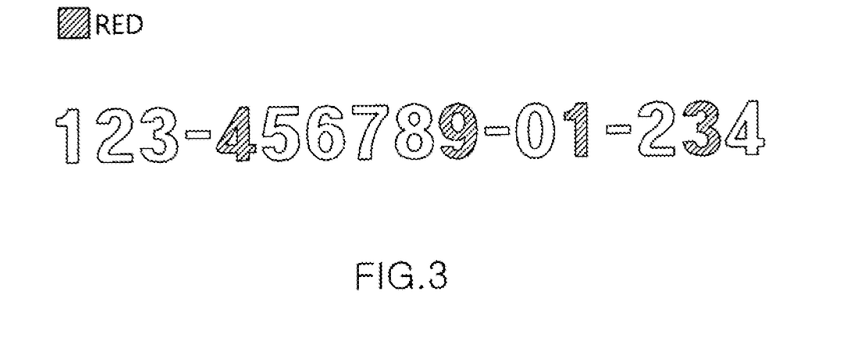
FIGS. 3 to 6 arc reference diagrams for describing the apparatus for authorizing online financial transactions in accordance with the first exemplary embodiment of the present invention.
Figure 4:
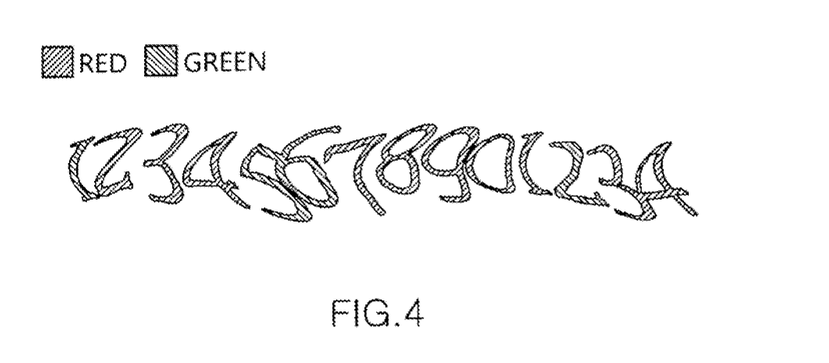
Figure 5:
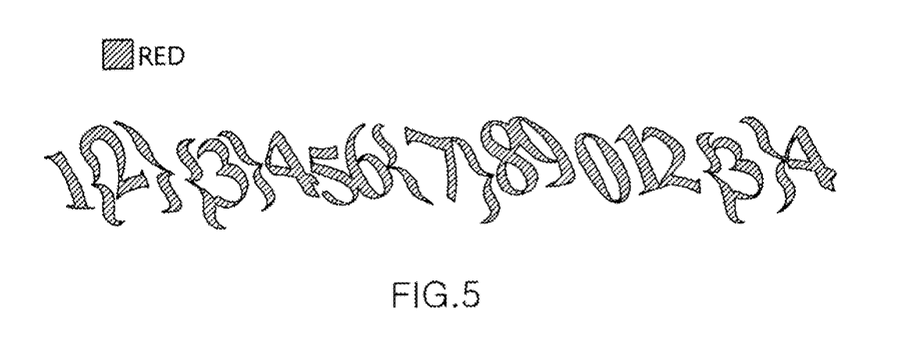
Figure 6:
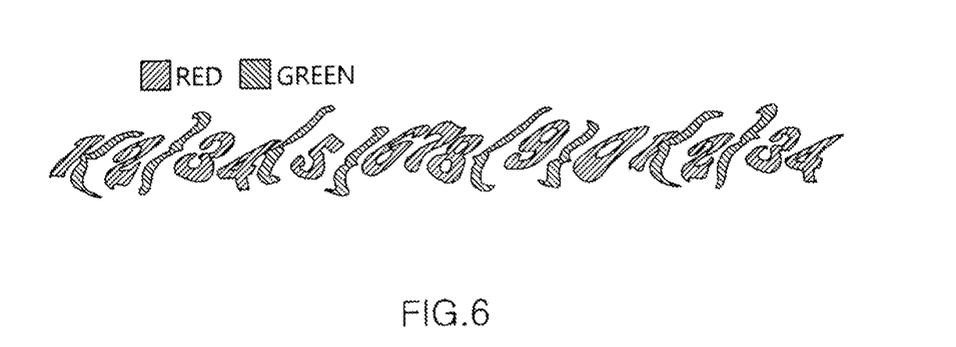

For example, the display unit 140 provides the converted authorization information, the main transaction information, and the authorization information converted in the conversion unit 120 to the user 30 using a set chroma, as illustrated in FIG. 3. In this case, the display unit 140 may use the set chroma, and may use a color, an underline, a font, a slope, a bracket, or the like, as illustrated in FIGS. 4 to 6, but is not limited thereto.

The input unit 150 receives the authorization information recognized by the user 30, that is, user select information, which is part of the main transaction information, and the converted authorization information provided from the display unit 140.

The user recognition determination unit 160 compares the user select information with the created authorization information and determines whether the user 30 recognizes the authorization information based on the comparison results. In this case, the user recognition determination unit 160 permits progression to a subsequent step when the user select information is the same as the created authorization information.

For example, the apparatus 100 for authorizing online financial transactions in accordance with the first exemplary embodiment of the present invention may be applied to a process wherein the user is allowed to perform a transfer through Internet banking.

In detail, the user 30 inputs the information required to perform the transfer to the user terminal 20. Next, the apparatus 100 for authorizing online financial transactions performs a process of confirming a transfer.

The apparatus 100 for authorizing online financial transaction selects "4913" from account number "12345678901234", into which the user 30 will make a deposit, and provides the selected number "4913" to the user through the display unit 140, as illustrated in FIG. 4. 100571 Next, when the user 30 inputs "4913", that is, a portion of the account number into which the user 30 will make a deposit, into the user terminal 20, the apparatus for authorizing online financial transactions, which is communicating with the user terminal 20, confirms that the user has accurately recognizes the account number into which the user 30 will make a deposit, and permits progression to the next step.

Figure 7:
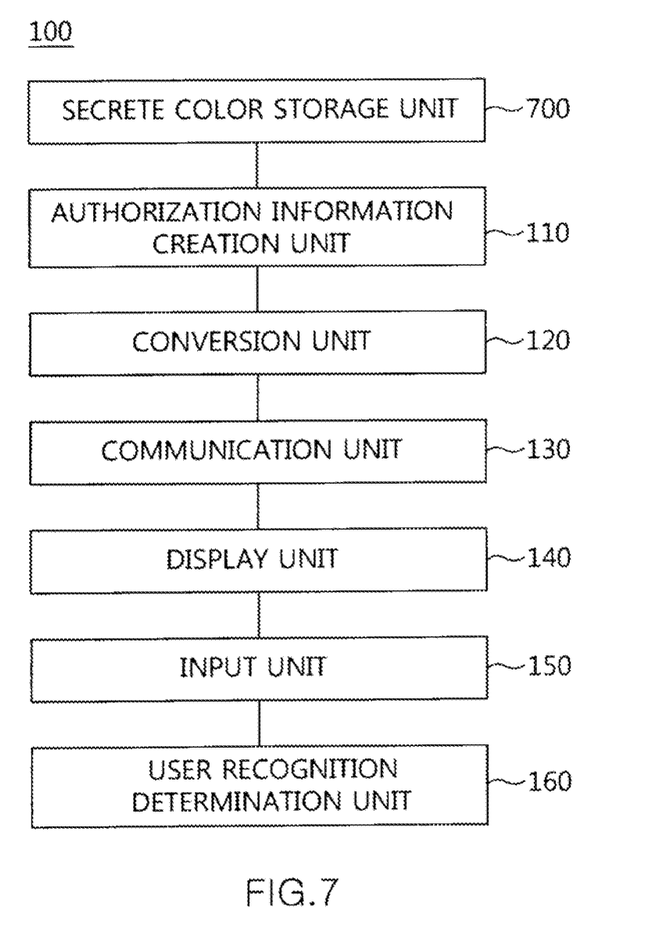
FIG. 7 is a configuration diagram schematically illustrating an apparatus for authorizing online financial transactions in accordance with a second exemplary embodiment of the present invention.

FIG. 7 is a configuration diagram schematically illustrating an apparatus for authorizing online financial transactions in accordance with a second exemplary embodiment of the present invention.

Referring to FIG. 7, the apparatus 100 for authorizing online financial transactions includes a secret color storage unit 700, the authorization information creation unit 110, the conversion unit 120, the communication unit 130, the display unit 140, the input unit 150, and the user recognition determination unit 160.

The secret storage unit 700 includes previously agreed-upon information, that is, set secret information, between the user and the server. Here, the secret information includes secret colors or secret characters, in addition to secret numbers used as a password, and the like. The secret storage unit

700 provides the secret information, which is required when the authorization information creation unit 110 creates the authorization information.

The authorization information creation unit 110 randomly selects a portion of main transaction information corresponding to a user and combines the selected information to create the authorization information. Here, the authorization information is information that is required in order to confirm whether the user recognizes transaction contents.

The conversion unit 120 converts the created authorization information into a form that is displayed to the user 20 using the secret information.

In detail, the conversion unit 120 converts the text corresponding to the created authorization information into the secret color text using the secret colors. In addition, the conversion unit 120 converts text corresponding to a portion other than the authorization information, which is part of the main transaction information, into text of another color using any number corresponding to a specific range. Here, the specific range is between (the number of authorization information−1) and (the number of authorization information+1). In addition, the conversion unit 120 converts the result of conversion into color text different from the secret color text into an image form. Here, the image form may be a form such as a CAPTCHA image.

The communication unit 130 provides the converted authorization information and the main transaction information through the user terminal 30 to the user 20 and transfers the request of the user, that is, the information input by the user, to the server 10.

The display unit 140 provides the main transaction information and the authorization information, which was converted in the conversion unit 120, to the user. In this case, the display unit 140 provides the main transaction information and the authorization information, converted in the conversion unit 120, to the user, such that the user may select the authorization information based on the secret colors.

Figure 8:
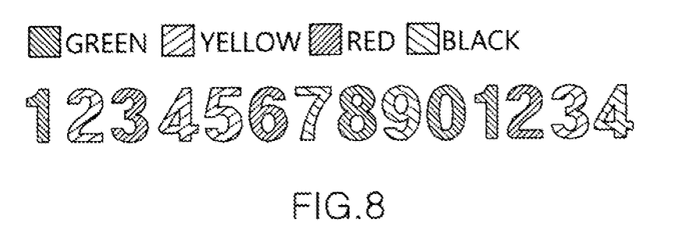
FIGS. 8 and 9 are reference diagrams for describing the apparatus for authorizing online financial transactions in accordance with the second exemplary embodiment of the present invention.
Figure 9:
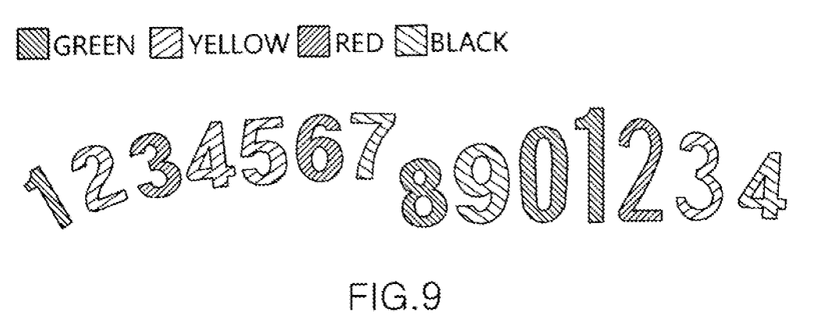

For example, the display unit 140 provides the authorization information, which was converted using the secret colors, to the user in image form, as illustrated in FIGS. 8 and 9. In this case, the display unit 140 may use the set color, and, as illustrated in FIG. 9, slope and the like, but it is not limited thereto.

The input unit 150 receives the authorization information recognized by the user 30, that is, the user select information, which is part of the main transaction information, and the randomly selected information provided from the display unit 140.

The user recognition determination unit 160 compares the user select information with the created authorization information and determines whether the user 30 recognizes the authorization information based on the comparison results. In this case, the user recognition determination unit 160 permits progression to a subsequent step when the user select information is the same as the created authorization information.

For example, the apparatus 100 for authorizing online financial transactions in accordance with the second exemplary embodiment of the present invention may be applied to a process for allowing the user to perform a transfer through Internet banking.

In detail, the user 30 inputs the information required to perform the transfer to the user terminal 20. Next, the apparatus 100 for authorizing online financial transactions performs a process of confirming a transfer.

The apparatus 100 for authorizing online financial transaction selects "2453" from account number "12345678901234", into which the user 30 will make a deposit, using a yellow color, which corresponds to the secret information, and provides the selected number "4913" to the user through the display unit 140, as illustrated in FIGS. 8 and 9.

Next, when the user 30 inputs "2453", that is, a portion of the account number into which the user 30 will make a deposit, to the user terminal 20, the apparatus for authorizing online financial transactions, which communicates with the user terminal 20, confirms that the user has accurately recognized the account number into which the user 30 will make a deposit, and permits progression to the next step.

Figure 10:
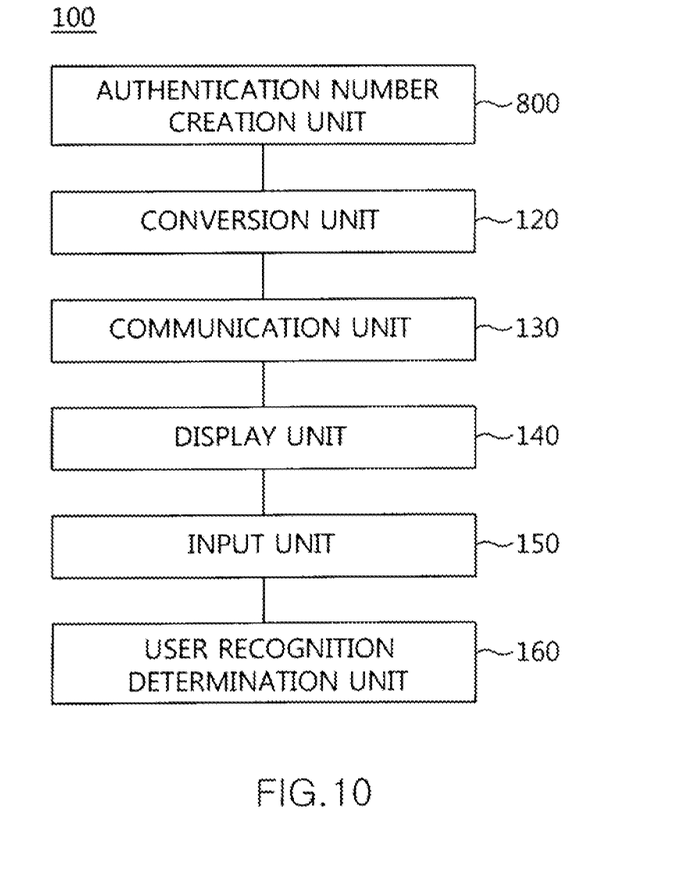
FIG. 10 is a configuration diagram schematically illustrating an apparatus for authorizing online financial transactions in accordance with a third exemplary embodiment of the present invention.

FIG. 10 is a configuration diagram schematically illustrating an apparatus for authorizing online financial transactions in accordance with a third exemplary embodiment of the present invention.

Referring to FIG. 10, the apparatus 100 for authorizing online financial transactions includes an authorization number creation unit 800, the authorization information creation unit 110, the conversion unit 120, the communication unit 130, the display unit 140, the input unit 150, and the user recognition determination unit 160.

The authorization number creation unit 800 creates the authorization number, which may be recognized by the user based on the OTP. In this case, the authorization number creation number 800 uses a first method for randomly selecting a portion of the main transaction information corresponding to the user and linking the selected information with the OTP to create the authorization number, a second method for designating one number of the OTP as the secret color and using the designated secret color as the authorization number, and a third method for using the main transaction information of digits corresponding to the OTP as the authorization number.

The authorization information creation unit 110 randomly selects a portion of the main transaction information corresponding to a user and combines the selected information to create the authorization information. Here, the authorization information is information that is required in order to confirm whether the user has recognized the transaction contents.

The conversion unit 120 converts the created authorization information into a form displayed to the user 20 through a specific process.

In detail, the conversion unit 120 converts the created authorization information into a text form that may be recognized by the user, which is in turn converted into main transaction information including the authorization information. In addition, the conversion unit 120 converts the transaction information including the authorization information into an image form. Here, the image form may be a form such as a CAPTCHA image.

In addition, the conversion unit 120 includes a random color table, in which numbers and colors from 0 to 9 are matched. The conversion unit 120 designates secret colors using the random color table and the OTP, converts the text corresponding to the authorization information in the main transaction information into the secret color text, and converts text not corresponding thereto into text of another color in the random color table using any number corresponding to the specific range. Here, the specific range is between (the number of authorization information−1) and (the number of authorization information+1). In addition, the conversion unit 120 converts the result of conversion into color text that is different from the secret color text into an image form. Here, the image form may be a form such as a CAPTCHA image.

The communication unit 130, which serves to transmit and receive data between the server 10 and the user terminal 30, provides the converted authorization information and the main transaction information to the user 20 through the user terminal 30, and transmits the request of the user, for example, the information input by the user, to the server 10.

The display unit 140 provides to the user the main transaction information, of which the authorization information may be recognized by the user.

The input unit 150 receives the authorization information recognized by the user 30, that is, user select information, which is part of the main transaction information provided from the display unit 140. Here, the authorization number is a number generated using a method ranging from the first method to the third method in the authorization number creation unit 800.

Figure 11:
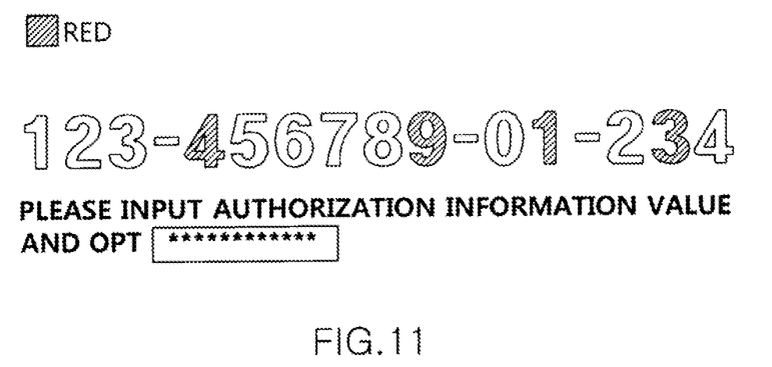
FIGS. 11 to 14 are reference diagrams for describing the apparatus for authorizing online financial transactions in accordance with the third exemplary embodiment of the present invention.
Figure 12:
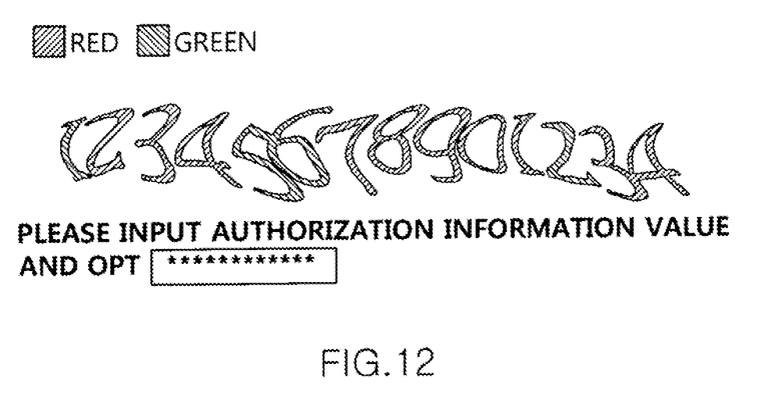

FIGS. 11 and 12 illustrate the method for receiving an authorization number generated using the first method in the apparatus for authorizing online financial transactions in accordance with the third exemplary embodiment of the present invention.

First, the first method is a method for generating an authorization number that randomly selects a portion of the main transaction information corresponding to the user in the authorization number creation unit 800 and links the selected information with the OTP.

The input unit 150, which receives the authorization number created based on the first method, is necessarily subjected to keyboard security. Here, when inputting the OTP behind the authorization number, it is impossible to change only the authorization number without changing the input OTP.

Referring to FIGS. 11 and 12, the display unit 140 uses the set chroma, color, slope, and the like, to provide the main transaction information and the authorization number to the user 30. In addition, the display unit 140 provides the message "please input the authorization information value and the OTP" to the user to receive the user select information through the input unit 150.

Figure 13:
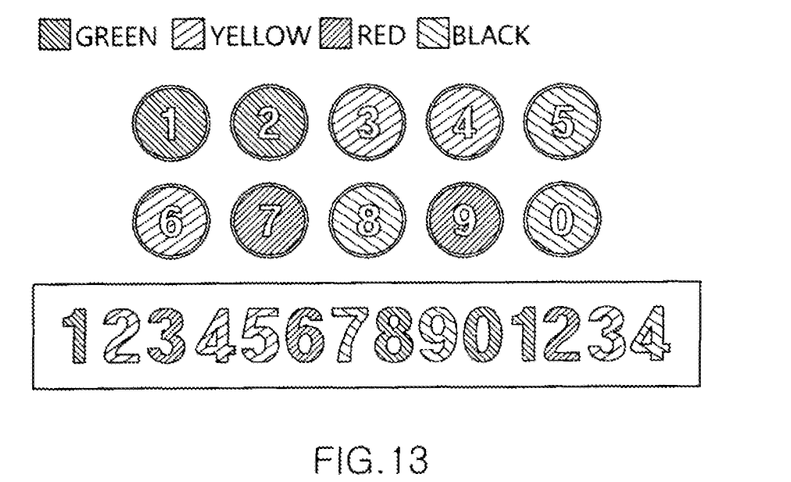

FIG. 13 illustrates the method for receiving an authorization number created by the second method in the apparatus for authorizing online financial transactions in accordance with the third exemplary embodiment of the present invention.

First, the second method is a method that designates one of the OTP as the secret colors in the authorization number creation unit 800 and uses the designated secret colors as the authorization number.

Referring to FIG. 13, when the OTP value is "123456" and the value corresponding to the final "6" is the secret color designation value, a yellow color, which corresponds to "6," is the secret color, and therefore "2453" is used as the authorization number.

Figure 14:
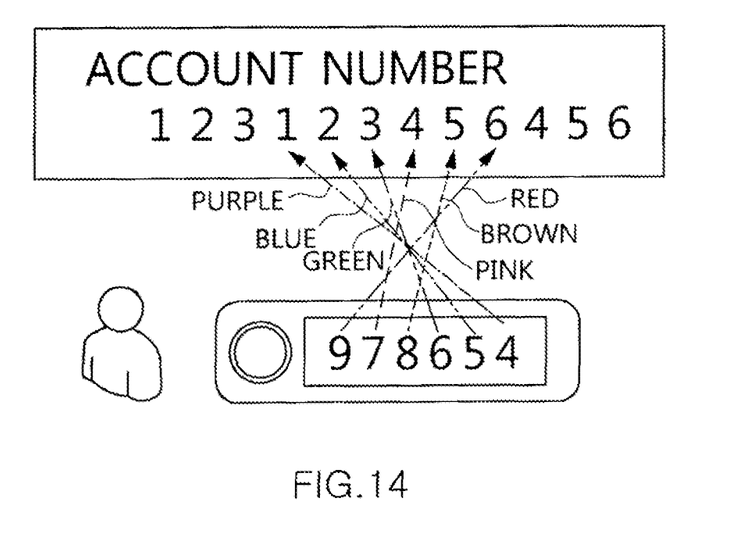

FIG. 14 illustrates a method for receiving the authorization number created by the third method in the apparatus for authorizing online financial transactions in accordance with the third exemplary embodiment of the present invention.

First, the third method is a method in which main transaction information corresponding to the OTP in the authorization number creation unit 800 is used as the authorization number.

Referring to FIG. 14, when the user 30 intends to perform a transfer to account number "123123456456," if the created OTP (or a security card number) is "978654," the apparatus 100 for authorizing online financial transactions provides "123123456456" to the user and waits for the user input. Next, the user uses the OTP and the account number to input the account number that is included in digits corresponding to the OTP. In the case of FIG. 14, the user 30 inputs "645321" for a normal transaction.

In this case, the apparatus 100 for online financial transactions knows the account number and the OTP to be created and therefore, knows that the user needs to input "645321."

The user recognition determination unit 160 compares the user select information with the created authorization information and determines whether the user 30 recognizes the authorization number based on the comparison results. In this case, the user recognition determination unit 160 permits progression to a subsequent step when the user select information is the same as the created authorization information.

Next, the method for authorizing online financial transactions will be described in detail with reference to FIG. 15.

Figure 15:
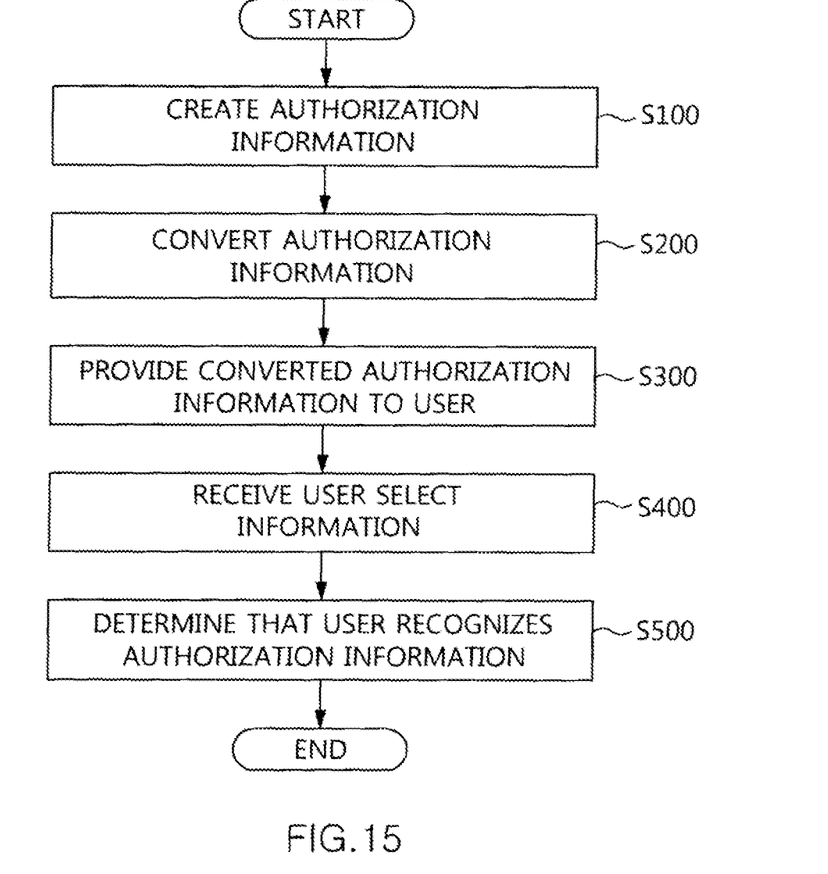
FIG. 15 is a flow chart illustrating a method for authorizing online financial transactions in accordance with the first to third exemplary embodiments of the present invention.

FIG. 15 is a flow chart illustrating a method for authorizing online financial transaction in accordance with the first to third exemplary embodiments of the present invention.

Referring to FIG. 15, the apparatus 100 for authorizing online financial transactions randomly selects a portion of the main transaction information corresponding to the user and combines the selected information to create the authorization information (S100). Here, the authorization information is information that is required in order to confirm whether the user has recognized transaction contents.

The apparatus 100 for authorizing online financial transactions converts the created authorization information into a form displayed to the user 20 through a specific process (S200).

In detail, the apparatus 100 for authorizing online financial transactions in accordance with the first exemplary embodiment of the present invention converts the created authorization information into the text form that may be recognized by the user, which is in turn converted into main transaction information that includes the authorization information. In addition, the apparatus 100 for authorizing online financial transactions converts the transaction information including the authorization information into an image form. Here, the image form may be a form such as a CAPTCHA image.

In addition, the apparatus 100 for authorizing online financial transactions in accordance with the second exemplary embodiment of the present invention converts the text corresponding to the created authorization information into the secret color text using the secret colors. In addition, the apparatus 100 for authorizing online financial transactions converts text corresponding to a portion other than the authorization information, which is part of the main transaction information, into text of another color using any number that falls within a specific range. Here, the specific range is between (the number of authorization information−1) and (the number of authorization information+1). In addition, the apparatus 100 for authorizing online financial transactions converts the result of conversion into color text that is different from the secret color text into an image form. Here, the image form may be a form such as a CAPTCHA image.

Further, the apparatus 100 for authorizing online financial transactions in accordance with the third exemplary embodiment of the present invention includes the random color table in which numbers and colors from 0 to 9 are matched. The apparatus for authorizing online financial transactions designates the secret colors using the random color table and the OTP and converts text corresponding to the authorization information, which is part of the main transaction information, into the secret color text, and converts text not corresponding thereto into text of another color in the random color table using any number that falls within the specific range. Here, the specific range is between (the number of authorization information−1) and (the number of authorization information+1). In addition, the apparatus 100 for authorizing online financial transactions converts the result of conversion into color text that is different from the secret color text into an image form. Here, the image form may be a form such as a CAPTCHA image.

The apparatus 100 for authorizing online financial transactions provides the main transaction information and the authorization information, converted at S200, to the user (S300). As described above, the apparatus 100 for authorizing online financial transactions provides both the main transaction information and the converted authorization information to the user, such that the user 30 may recognize that the authorization information is a selected portion of the main transaction information. In this case, the apparatus 100 for authorizing online financial transactions provides the authorization information to the user using a chroma, a color, an underline, a font, a slope, a bracket, or the like.

The apparatus 100 for authorizing online financial transactions receives the authorization information recognized by the user 30, that is, the user select information, which is part of the main transaction, information, and the converted authorization information provided at S300 (S400).

The apparatus 100 for authorizing online financial transactions compares the user select information with the authorization information created at S100 and determines whether the user 30 recognizes the authorization information based on the comparison results (S500). In this case, the apparatus 100 for authorizing online financial transactions permits progression to a subsequent step when the user select information is the same as the created authorization information.

In accordance with the exemplary embodiments of the present invention, the method and apparatus for authorizing online financial transactions can confirm whether the transaction is normal by again transferring the contents recognized by the user to the server, when the input values are exposed to hackers in an MITM attack and, as a result, the hackers modulate the transfer information and then, forge a normal transaction with the modulated information using the exposed input values.

Further, in accordance with the first exemplary embodiment of the present invention, the method and apparatus for authorizing online financial transactions can randomly use a portion of the important transaction information as the authorization information, thereby confirming whether the user has accurately recognized the transaction information. Further, when hackers modulate the important transaction information into their own information, the authorization information created based on the hacker information cannot be again represented using the normal information by the hackers, thereby decreasing the likelihood of an MITM attack. In addition, the randomly selected authorization information is a set of any characters or numbers, thereby effectively withstanding to an attack through the input of any value.

Further, in accordance with the second exemplary embodiment of the present invention, the method and apparatus for authorizing online financial transactions can randomly use a portion of the important transaction information as authorization information, similar to the first exemplary embodiment of the present invention, thereby confirming whether the user has accurately recognized the transaction information. In addition, even when the screen on which the main transaction information is displayed is exposed to the hackers, the hackers cannot infer the authorization values, to thus effectively withstand MITM attacks, including screen exposure attacks.

Further, in accordance with the third exemplary embodiment of the present invention, the method and apparatus for authorizing online financial transactions can use both the OTP and the main transaction information, thereby confirming whether the user has accurately recognized the transaction information. Moreover, the method for generating an authorization number by linking the random authorization information with the OTP cannot change only the random authorization number without erasing the OTP when hackers perform an attack of modulating the authorization information into numbers determined by the hackers, thereby effectively withstanding the corresponding attack. In addition, the method for designating secret colors based on the OTP and receiving the values corresponding to the secret colors as user input can continuously change the secret colors, thereby effectively withstanding hacker attacks in which the secret colors are exposed. Further, in the method for allowing a user to receive the main transaction information of the digits corresponding to the OTP as the authorization number, the OTP cannot be directly input, and thus the OTP cannot be guessed through the reverse operation, thereby effectively defending against hacker attacks even under the condition in which all of the user input is exposed by the MITM attack.

While the present invention has been described with respect to the specific embodiments, it will be apparent to those skilled in the art that various changes and modifications may be made without departing from the spirit and scope of the invention as defined in the following claims.

What is claimed is:

1. An apparatus for authorizing online financial transaction, comprising:
   an authorization information creation unit configured to randomly select a portion of the transaction information corresponding to a user and to combine all the selected information to create authorization information;
   an authorization number creation unit configured to create an authorization number based on an OTP (One-Time Password);
   a conversion unit configured to convert the authorization information into a display displayed to the user through a specific process;
   a display unit configured to provide the transaction information and the converted authorization information to the user;
   an input unit configured to receive user selected information from the transaction information and the converted authorization information from the display unit based on the OTP corresponding to the user; and
   a user recognition determination unit configured to compare the user select information with the authorization information and determine whether the user recognizes the authorization information based on comparison results,
   wherein the authorization number creation unit designates one number of the OTP as a secret color and uses one number designated as the secret color as the authorization number.

2. The apparatus of claim 1, wherein the authorization number creation unit links information randomly selecting a portion of the transaction information with the OTP in the authorization information creation unit to create the authorization number.

3. The apparatus of claim 1, wherein the authorization number creation unit uses the transaction information of digits corresponding to the OTP as the authorization number.

4. The apparatus of claim 1, wherein the conversion unit converts the text corresponding to the authorization information into secret color text by using the secret colors among the secret information and converts text corresponding to a portion other than the authorization information into other color text.

5. The apparatus of claim 1, wherein the conversion unit includes a random color table including numbers from 0 to 9 and colors corresponding to each number, designates secret colors using the random color table and the OTP, converts the text corresponding to the authorization information into the secret color text in the transaction information, and converts the text that do not correspond to the authorization information into other color text in the main transaction information.

6. The apparatus of claim 5, wherein the secret color text and other color text is converted into an image form like a CAPTCHA image.

* * * * *